United States Patent
Oh

(10) Patent No.: US 10,180,534 B2
(45) Date of Patent: Jan. 15, 2019

(54) BORDERLESS DISPLAY DEVICE INCLUDING DISPLAY MODULE

(71) Applicant: LG Display Co., Ltd., Seoul (KR)

(72) Inventor: GuenTaek Oh, Busan (KR)

(73) Assignee: LG Display Co., Ltd., Seoul (KR)

( * ) Notice: Subject to any disclaimer, the term of this patent is extended or adjusted under 35 U.S.C. 154(b) by 13 days.

(21) Appl. No.: 15/394,798

(22) Filed: Dec. 29, 2016

(65) Prior Publication Data

US 2017/0192163 A1   Jul. 6, 2017

(30) Foreign Application Priority Data

Dec. 30, 2015  (KR) .................... 10-2015-0190373
Oct. 27, 2016  (KR) .................... 10-2016-0141231

(51) Int. Cl.
*F21V 8/00* (2006.01)
*G06F 1/16* (2006.01)

(52) U.S. Cl.
CPC ......... *G02B 6/0088* (2013.01); *G06F 1/1637* (2013.01)

(58) Field of Classification Search
CPC ............ G02B 6/0081; G02F 1/133308; G02F 2001/133314; G02F 2001/133317; G02F 2001/133322; G02F 2001/13332; G02F 2201/465; G06F 1/1637
See application file for complete search history.

(56) References Cited

U.S. PATENT DOCUMENTS

| | | | |
|---|---|---|---|
| 8,610,842 B2 | 12/2013 | Kim et al. | |
| 2008/0151138 A1 | 6/2008 | Tanaka | |
| 2011/0019122 A1* | 1/2011 | Lin .................. | G02F 1/133308 349/58 |
| 2011/0157061 A1 | 6/2011 | Kao et al. | |

(Continued)

FOREIGN PATENT DOCUMENTS

| | | | | |
|---|---|---|---|---|
| CN | 202615076 | * | 12/2012 | ............... G02F 1/13 |
| CN | 20270414 | * | 2/2013 | ............... G02F 1/13 |

(Continued)

OTHER PUBLICATIONS

English Machine Translations of CN202615076 and CN202720414 provided by Espacenet.*

(Continued)

*Primary Examiner* — Zheng Song
(74) *Attorney, Agent, or Firm* — Fenwick & West LLP

(57) ABSTRACT

Disclosed herein is a borderless display device including a display panel, a cover, and a guide panel between the display panel and the cover. The guide panel is attached to the display panel through an attaching member. The guide panel includes a first light shielding portion protruding from a body portion of the guide panel towards the surface of the display panel, and a second light shielding portion protruding from the body portion towards the surface of the display panel, a first fastening portion protruding from the body portion towards the cover, and a second fastening portion protruding from the body portion towards the cover. The attaching member is disposed between the first light shielding portion and the second light shielding portion. A side surface of the cover protrudes from the planar surface towards the first direction, and is inserted between the first fastening portion and the second fastening portion.

29 Claims, 5 Drawing Sheets

(56) References Cited

U.S. PATENT DOCUMENTS

| | | |
|---|---|---|
| 2011/0260959 A1 | 10/2011 | Son et al. |
| 2012/0092583 A1 | 4/2012 | Nakagawa et al. |
| 2012/0188790 A1* | 7/2012 | Isobe ................. G02B 6/009 362/602 |
| 2012/0281383 A1 | 11/2012 | Hwang et al. |
| 2013/0027965 A1* | 1/2013 | Noh ................. G02F 1/133385 362/602 |
| 2013/0258240 A1* | 10/2013 | Yu ................. G02F 1/133608 349/61 |
| 2014/0043560 A1 | 2/2014 | Jang et al. |
| 2014/0139778 A1* | 5/2014 | Wang ................. G02F 1/133308 349/58 |
| 2014/0176849 A1 | 6/2014 | Lee et al. |
| 2014/0176852 A1* | 6/2014 | Ha ................. G02F 1/133308 349/58 |
| 2014/0176869 A1 | 6/2014 | Lee et al. |
| 2014/0293574 A1* | 10/2014 | Hwang ............. G02F 1/133308 362/19 |
| 2014/0320778 A1* | 10/2014 | Tang ................. G02F 1/133308 349/58 |
| 2015/0168640 A1 | 6/2015 | Jeong et al. |
| 2015/0212361 A1* | 7/2015 | Zhao ................. G02F 1/133308 349/58 |
| 2015/0241731 A1 | 8/2015 | Jeong et al. |
| 2015/0362787 A1* | 12/2015 | Yuan ................. G02F 1/133308 349/58 |
| 2015/0370122 A1* | 12/2015 | Hsu ................. G06F 3/0412 345/173 |
| 2016/0062523 A1 | 3/2016 | Jeong |
| 2016/0223739 A1* | 8/2016 | Yoon ................. G02B 6/0088 |
| 2017/0261804 A1 | 9/2017 | Zhao et al. |

FOREIGN PATENT DOCUMENTS

| | | |
|---|---|---|
| CN | 103792706 | 5/2014 |
| CN | 104391399 | 3/2015 |
| JP | 2008158432 | 7/2008 |
| JP | 2012083616 | 4/2012 |
| JP | 2014-123106 A | 7/2014 |
| JP | 2014123122 | 7/2014 |
| KR | 10-2011-0119362 | 11/2001 |
| KR | 10-2012-0123767 | 11/2012 |
| KR | 20150027969 | 3/2015 |
| KR | 10-2015-0063783 | 6/2015 |
| TW | I426426 B | 2/2014 |

OTHER PUBLICATIONS

Office Action for Korean Patent Application No. KR 10-2016-0141231, dated Nov. 16, 2016, 7 Pages.

Extended European Search Report for European Patent Application No. EP 16207515.4, dated Aug. 17, 2017, 8 Pages.

Notification of Reasons for Refusal for Japanese Patent Application No. JP 2017-000162, dated Dec. 25, 2017, 13 Pages (With English Translation).

Office Action for Taiwan Patent Application No. TW 105143855, dated Oct. 6, 2017, 5 Pages (With English Translation).

Japanese Patent Office, Office Action, JP Patent Application 2017-000162, dated Oct. 17, 2018, six pages (with concise explanation of relevance).

* cited by examiner

BORDERLESS DISPLAY DEVICE INCLUDING DISPLAY MODULE

CROSS-REFERENCE TO RELATED APPLICATIONS

Pursuant to 35 U.S.C. § 119(a), this application claims the benefit of earlier filing date and right of priority to Korean Application No. 10-2015-0190373 filed on Dec. 30, 2015 and Korean Application No. 10-2016-0141231, filed on Oct. 27, 2016, filed in Republic of Korea, all of which are incorporated by references herein in their entirety.

BACKGROUND

1. Related Field

The present disclosure relates to a display device, and more particularly, to a borderless display device of which a boundary of a front of a display screen is not covered when a display module is mounted.

2. Description of the Conventional Art

In recent days, there has been an increase in demand for flat panel display devices having thin, light weight, and small profiles for applications in portable electronic devices such as mobile phones, tablet PCs, and notebook computers. As the flat panel display devices, a liquid crystal display, a plasma display panel, an organic light emitting display, an electrophoretic display, and the like have been actively researched.

Such display devices are used in electronic devices such as large-sized TV as well as portable devices such as mobile phones, tablet PCs, and notebook computers.

Meanwhile, a borderless display device, in which a frame covering a front of a display screen is removed, has recently been proposed so as to decrease the area and weight of the display device and to improve aesthetic quality of the display device by minimizing a bezel region. In the borderless display device, a flat screen is formed without any frame covering a boundary of a front of the flat screen.

Typically, in the borderless display device, when a display module and a middle frame of an outer case are assembled, a cover glass made of a tempered glass covering the display module, covers upper surfaces of a screen and the middle frame, thereby removing a frame covering a front of the screen.

However, in the borderless display device having the above-described structure, because of an expensive cover glass, the manufacturing cost of the display device increases, and the weight of the manufactured display device increases due to the weight of the cover glass. In addition, since a process of attaching the cover glass is added, the time required to perform a manufacturing process is delayed.

SUMMARY

In one or more embodiments, a borderless display device is disclosed. The borderless display device includes a display panel, of which a front and side are exposed without any separate cover glass. The display panel of the display device is supported by a guide panel, and the guide panel may be coupled to a middle frame.

Coupling parts may be respectively provided in the guide panel and the middle frame, so that the guide panel and the middle frame are coupled to each other. The middle frame may be coupled to a lower region of the guide panel, and an upper surface of the middle frame may be disposed in the lower region of the guide panel. Thus, any part of the display device may not protrude upward from the display panel, and the front and side of the display panel may be exposed.

The display panel may be attached to an upper surface of the guide panel by an attaching member. The attaching member may have a black color, and may prevent light from being leaked to a side of the display panel. The attaching member may be formed of a material that allows light corresponding to a specific wavelength to be transmitted therethrough, and band-shaped light of a set color may be displayed on a border of the display panel.

Furthermore, a light shielding part for blocking light transmission may be provided between the display panel and the upper surface of the guide panel. The light shielding part may be installed at the guide panel or may be installed at the middle frame. The light shielding part may be integrated with or separated from the guide panel. Also, the light shielding part may be integrated with or separated from the middle frame.

Examples of the display panel may include a liquid crystal panel, an organic light emitting display panel, an electrophoretic display panel, or any combination thereof. When the display panel is a liquid crystal panel, the display device may further include a backlight that supplies light to the liquid crystal panel.

When a display element is assembled with the display device, the front of the display device in which an image is implemented may be exposed without being covered by any frame of the display device. The front of the display device may have a flat surface.

In addition, a borderless display device can be manufactured without a cover glass. Hence, the manufacturing cost of the display device can be reduced, and weight of the display device can be reduced. In addition, a non-display region in which an image is not displayed at an edge of the screen can be reduced.

Furthermore, the light shielding portion can prevent light from being leaked to a side of the display panel. In addition, the attaching member between the display panel and the upper surface of the guide panel may be formed of a material through which light having a specific wavelength is transmitted. Accordingly, band-shaped light of a set color corresponding to the specific wavelength may be displayed at a boundary of the display device.

In one or more embodiments, a borderless display device is disclosed. The display device includes a display panel, a guide panel and a cover. The guide panel is coupled to a surface of the display panel through an attaching member. The guide panel includes: a body portion facing the surface of the display panel in a first direction, a first light shielding portion protruding from the body portion in the first direction towards the surface of the display panel, the first light shielding portion closer to a center of the display panel than the attaching member, a second light shielding portion protruding from the body portion in the first direction towards the surface of the display panel, the second light shielding portion farther away from the center of the display panel than the attaching member, a first fastening portion protruding from the body portion in a second direction away from the first direction, and a second fastening portion protruding from the body portion in the second direction. The cover includes: a planar surface facing the display panel in the first direction, and a side surface protruding from the planar surface towards the first direction, where the side surface is inserted between the first fastening portion and the second fastening portion.

In one or more embodiments, another surface of the display panel facing in the first direction is not covered by any portion of the display device.

In one or more embodiments, the second light shielding portion is exposed in a third direction different from the first direction and the second direction. A side of the second light shielding portion, a side of the body portion, and a side of the second fastening portion may be integral to form a flushed surface. The second light shielding portion, the side of the body portion, and the second fastening portion may be exposed in the third direction. The side of the second light shielding portion, the side of the body portion, and the side of the second fastening portion may not be covered by any portion of the display device in the third direction.

In one or more embodiments, the display device further includes: a light guide directly coupled to an additional cover, where the additional cover is disposed between the light guide and the cover. The light guide may project light towards the surface of the display panel. The second light shielding portion may prevent the light from leaking in the third direction. The display device may further include a light source coupled to the additional cover. The light source may project light into the light guide.

In one or more embodiments, the display device further includes: a light guide directly coupled to the planar surface of the cover. The light guide may project light towards the surface of the display panel. The second light shielding portion may prevent the light from leaking in the third direction. The display device may further include a light source coupled to a surface of the first fastening portion facing away from the second fastening portion. The light source may project light into the light guide.

In one or more embodiments, the attaching member is configured to pass through a portion of light corresponding to a predetermined wavelength, and to filter another portion of the light corresponding to another wavelength.

In one or more embodiments, the first fastening portion and the second fastening portion face each other, and press the side surface of the cover there between. The first fastening portion may include a coupling portion protruding towards the second fastening portion, and the side surface may include an indented portion corresponding to the coupling portion. Alternatively or additionally, the second fastening portion may include a coupling portion protruding towards the first fastening portion, and the side surface may include an indented portion corresponding to the coupling portion. The coupling portion may be inserted into the indented portion to couple the cover to the guide panel.

In one or more embodiments, the side surface includes a coupling portion protruding towards the first fastening portion, and the first fastening portion includes an indented portion corresponding to the coupling portion. The coupling portion may be inserted into the indented portion to couple the cover to the guide panel.

In one or more embodiments, a borderless display device includes: a display panel; a guide panel coupled to a surface of the display panel through an attaching member, the guide panel including: a body portion facing the surface of the display panel in a first direction, a light shielding portion protruding from the body portion in the first direction towards the surface of the display panel, the light shielding portion farther away from a center of the display panel than the attaching member, and a fastening portion protruding from the body portion in a second direction away from the first direction, a side of the light shielding portion, a side of the body portion, and a side of the fastening portion being integral to form a surface, the side of the light shielding portion, the side of the body portion, and the side of the fastening portion not covered by any portion of the display device itself in a third direction; and a cover coupled to the guide panel through the fastening portion.

Further scope of applicability of the present application will become more apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of various embodiments disclosed herein, and are incorporated in and constitute a part of this specification, illustrate exemplary embodiments and together with the description serve to explain the principles of the various embodiments.

In the drawings.

DETAILED DESCRIPTION OF EXEMPLARY EMBODIMENTS

Figure 1:
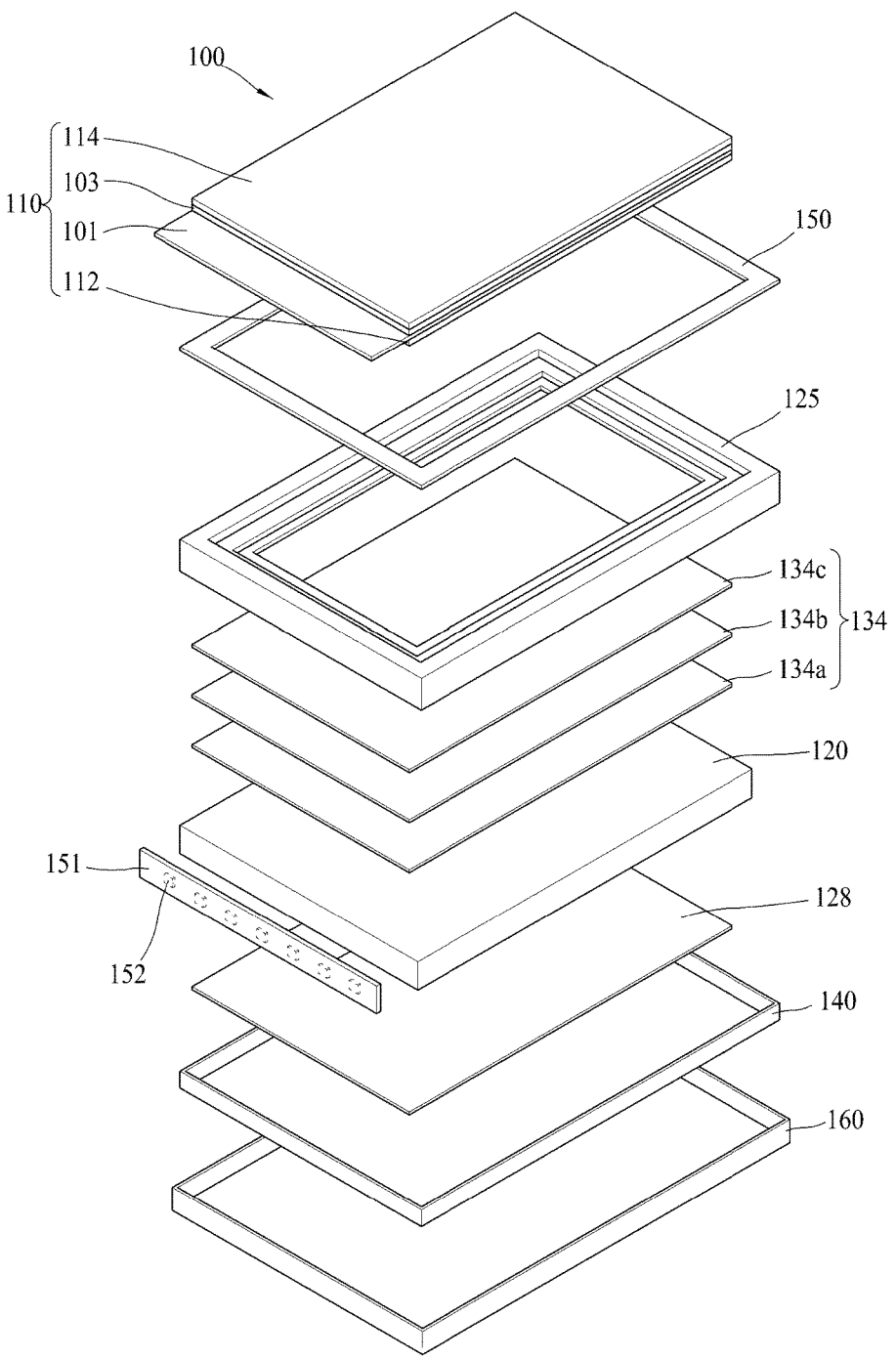
FIG. 1 is an exploded perspective view of a display device according to a first exemplary embodiment.

Description will now be given in detail of the exemplary embodiments, with reference to the accompanying drawings.

In the present disclosure, a display module is assembled at a middle frame of an outer case of the display device. That is, the middle frame serves as a coupling means by which the display module and the outer case of the display device are coupled to each other.

In a conventional display device, a middle frame is a region that is disposed along the outer circumference of the display module to be exposed to the outside together with a screen of the display module. For example, in the case of a TV, a middle frame is a region that forms a frame region of a screen disposed at an image display side of a display device, i.e., at the front of the display device to be exposed to the outside together with the screen. In the case of a conventional borderless display device, since upper surfaces of a display module and a middle frame, which are exposed to the outside, are covered by a cover glass, the upper surfaces of the display module and the middle frame are formed on a same plane, and an upper surface of the display module is not covered by an upper surface of the middle frame.

That is, in the conventional display device, a separate cover glass is formed on the upper surface of the display module and the middle frame, such that the upper surface of the display module is not covered by the upper surface of the middle frame, i.e., the upper surface of the outer case of the display device. The screen of the display panel and the upper surface of the middle frame may not be on a same level, and the front of the display module and the middle frame may be coupled to the cover glass without the middle frame covering the front of the display module. In addition, since an external material penetrates through a gap having a certain distance, which may be generated between the display module and the middle frame when the display module and the middle frame are assembled, the gap between the display module and the middle frame is blocked by the cover glass, thereby preventing penetration of the external material.

However, the cover glass is an expensive component, thus, a manufacturing cost of the display device increases, and the weight of the display device manufactured using the cover glass increases. In particular, since a large-area cover glass is implemented in a display device employed in a large-area electronic device such as a large-sized TV, the manufacturing cost of the display device increases, and the weight of the display and the weight of an electronic device employing the same increase accordingly. In addition, a process of attaching the cover glass is included, thus a manufacturing process of the display becomes complicated.

In one or more embodiments, when the display device is assembled, the display module is exposed to a screen region, and the outer case of the display device, e.g., the middle frame of the outer case does not cover the screen region, so that the front of the display device, at which a screen is disposed, is entirely formed as a flat plane having the same level by an upper substrate of the display module. Also, in one or more embodiments, the display module is coupled to the middle frame to be assembled with the outer case of the display device, but the middle frame is prevented from being exposed to the front of the screen, as the middle frame is disposed at a lower portion of the display module. Thus, a borderless display device can be manufactured without using any separate cover glass. This will be described in more detail with reference to the accompanying drawings.

Meanwhile, in the following description, a liquid crystal display module is described as an example of the display module, but this is for convenience of description. In addition to the liquid crystal display module, various display modules such as an organic light emitting display module and an electrophoretic display module may be applied to the display module of the present disclosure.

Figure 2:
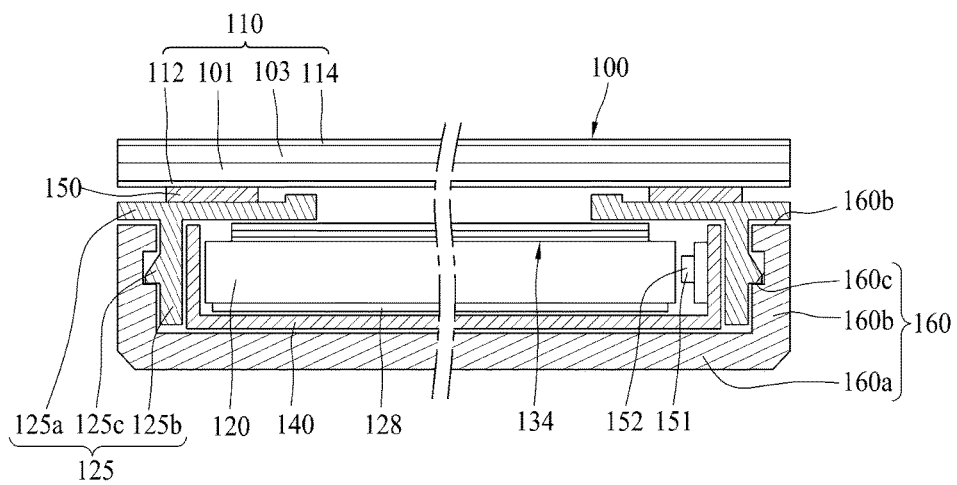
FIG. 2 is a sectional view of the display device according to the first exemplary embodiment.

FIG. 1 is an exploded perspective view of a display device according to a first exemplary embodiment. FIG. 2 is a sectional view of the assembled display device. In these figures, a middle frame coupled to an actual display module has been illustrated as a portion of the outer case of the display device. Although not shown in these figures, the display module is coupled to the outer case by the middle frame.

In this case, the display device may refer to a portion of an electronic device. For example, in the case of a TV, the display device may refer to a front surface of a TV main body, to which a screen of the TV is exposed. In the case of a computer, the display device may refer to a monitor. In the case of a notebook computer, the display device may refer to a monitor connected by a hinge. In the case of a mobile communication device, the display device may refer to a front surface of a main body of the mobile communication device, to which a screen is exposed.

As shown in FIGS. 1 and 2, the display device according to the first exemplary embodiment includes a display module 100 and an outer case of the display module 100, i.e., a middle frame 160, to which the display module is coupled and mounted.

The display module 100 is a liquid crystal display module, and largely includes a liquid crystal panel 110 that implements an image and a backlight that supplies light to the liquid crystal panel 110. The liquid crystal panel 110 includes a first substrate 101, a second substrate 103, and a liquid crystal layer (not shown) disposed therebetween, so that an image is implemented as a signal is applied from the outside.

However, in the present disclosure, the display module 100 is not limited to the liquid crystal display module, and various display modules such as an organic light emitting display module, a plasma display module, and an electrophoretic display module may be applied to the display module 100.

The backlight includes a light emitting device (LED) substrate 151 disposed at a lower side of the liquid crystal panel 110 to allow a plurality of LEDs 152 emitting light to be mounted thereon, a light guide plate 120 (also referred to as "a light guide 120" herein) disposed under the liquid crystal panel 110 to guide light emitted from the LED 152 and supply the light to the liquid crystal panel 110, an optical sheet 134 including a diffusion sheet 134a and prism sheets 134b and 134c, which are provided between the liquid crystal panel 110 and the light guide plate 120 to diffuse and condense light guided by the light guide plate 120 and supply the light to the liquid crystal panel 110, and a reflection plate 128 disposed under the light guide plate 120 to reflect light guided downward from the light guide plate 120.

The reflection plate 128, the light guide plate 120, and the optical sheet 134 of the backlight are accommodated in a lower cover 140 and then assembled, as the lower cover 140 and a guide panel 125 are coupled to each other.

The liquid crystal panel 110 is disposed over the guide panel 125. The guide panel 125 is formed as a quadrangular frame having a predetermined width such that an edge region of the liquid crystal panel 110 is placed on the guide panel 125. In this case, an adhesive member 150, which is provided in a quadrangular band having a predetermined width to allow the liquid crystal panel 110 to be adhered to the guide panel 125 therethrough, may be provided between the liquid crystal panel 110 and the guide panel 125.

The liquid crystal panel 110 includes a first substrate 101, a second substrate 103, and a liquid crystal layer (not shown) disposed between the first substrate 101 and the second substrate 103. The first substrate 101 and the second substrate 103 are made of a material that is transparent and flat and has smooth upper and lower surfaces, such as glass or plastic. Thus, when the display module is coupled to the display device, the second substrate 103 on which an image is displayed is exposed at a screen display side of the display device, so that the screen display side of the display device can be implemented to be smooth and borderless without a frame covering a front of the screen.

Although not shown in these figures, a plurality of gate lines and a plurality of data lines, which are arranged in lateral and longitudinal directions to define a plurality of pixel regions, may be formed on the first substrate 101. A thin film transistor as a switching element may be formed in each pixel region, and a pixel electrode may be formed on the pixel region. In addition, the thin film transistor may include a gate electrode connected to the gate line, a semiconductor layer formed by stacking amorphous silicon or the like on the gate electrode, and source and drain electrodes formed on the semiconductor layer, the source and drain electrodes being connected to the data line and the pixel electrode.

The second substrate 103 may include a color filter including a plurality of sub-color filters that implement colors of red (R), green (G), and blue (B), and a black matrix that divides the sub-color filters and blocks light transmitted through the liquid crystal layer.

The first and second substrates 101 and 103 facing each other are coupled to each other by a sealant (not shown) formed at the periphery of an image display region, thereby constituting the liquid crystal panel. The joining of the first and second substrates 101 and 103 may be performed through an attachment key (not shown) formed on the first substrate 101 or the second substrate 103.

A first polarizing plate 112 and a second polarizing plate 114 are respectively attached to the first substrate 101 and the second substrate 103 to polarize light input to and output from the liquid crystal panel 110, for displaying an image.

When another display panel, e.g., an organic light emitting display panel, a plasma display panel, or an electrophoretic display panel is used instead of the liquid crystal panel 110, an organic light emitting layer, a plasma layer, or an electrophoretic layer may be disposed between the first substrate 101 and the second substrate 103, instead of the liquid crystal layer for displaying an image.

The light guide plate 120 is used to guide light input from the LED 152 to the liquid crystal panel 110. Light is incident upon one side surface of the light guide plate 120. Incident light is reflected by upper and lower surfaces of the light guide plate 120 and is propagated to the outside of the light guide plate 120 through the other side surface. The light guide plate 120 may be configured as a rectangular parallelepiped. The light guide plate 120 may be made of a material such as polymethyl-methacrylate (PMMA), glass, or polyethylene terephthalate (PET), and an engraved pattern or embossed pattern may be formed at the lower surface of the light guide plate 120 to reflect light incident upon the lower surface to the top surface of the light guide plate 120.

Light incident upon the light guide plate 120 through the light incident surface of the light guide plate 120 is reflected by the upper and lower surfaces of the light guide plate 120 and propagated to a side surface opposite to the light incident surface. Light incident upon the upper surface at a critical angle or more with respect to a normal of the upper surface of the light guide plate 120 is reflected, and light incident upon the upper surface at an angle less than the critical angle is emitted through the upper surface of the light guide plate 120 and supplied to the liquid crystal panel 110. The optical sheet 134 improves the efficiency of light output from the light guide plate 120 to be supplied to the liquid crystal panel 110. The optical sheet 134 includes a diffusion sheet 134a that diffuses light output from the light guide plate 120, and a first prism sheet 134b and a second prism sheet 134c, which concentrates the light diffused by the diffusion sheet 134a to allow uniform light to be supplied to the liquid crystal panel 110. At this time, one diffusion sheet 134a is provided, but the first prism sheet 134b and the second prism sheet 134c, in which prisms perpendicularly intersect with each other, for example, in x-axis and y-axis directions, are provided as prism sheets, so that light is refracted in the x-axis and y-axis directions, thereby improving the linearity of light.

The LED 152 may include R, G, or B LEDs that emit single color light of R, G, and B, or an LED element that emits white light.

In one implementation, LEDs that each emits single color light (e.g., one of R, G, and B) are disposed in an alternating sequence, where each LED is separated from its adjacent LEDs by a predetermined distance such that the single color light emitted from the LEDs are mixed and then supplied to the liquid crystal panel 110. In another implementation, each of a plurality of LED elements is separated from its adjacent LEDs by a predetermined distance such that white light is supplied to the liquid crystal panel 110.

In one or more embodiments, the LED element that emits white light includes a blue LED that emits light of blue and a fluorescent substance that absorbs single color light of blue and emits light of yellow, so that single color light of blue, emitted from the blue LED, and single color light of yellow, emitted from the fluorescent substance, are mixed to be supplied as white light to the liquid crystal panel 110. In FIG. 1, the LED 152 is disposed on one side surface of the light guide plate 120. However, the LED 152 may be disposed on both side surfaces of the light guide plate 120.

The LED 152 is mounted on the LED substrate 151 made of a metal or flexible film. The LED substrate 151 is disposed along the side surface of the light guide plate 120 to face the side surface (i.e., the light incident surface) of the light guide plate 120, and the LED 152 is mounted on the LED substrate 151 such that light emitted from the LED 152 is incident upon the light guide plate 120 through the side surface of the light guide plate 120.

Although not shown in these figures, a flexible printed circuit board is attached to an end portion of the LED substrate 151 such that the LED 152 mounted on the LED substrate 151 is connected to an external driving circuit. Thus, a signal and power are input to an LED controller, and the LED controller drives the LED 152 in response to the input signal.

In other embodiments, the LED 152 may be replaced with a different type of light source. For example, a fluorescent lamp such as a cold cathode fluorescent lamp (CCFL) or an external electrode fluorescent lamp (EFFL) may be used as the light source of the present disclosure. When the fluorescent lamp is used, the LED substrate 151 may be omitted, and a lamp housing that accommodates the fluorescent lamp therein may be disposed at one side of the light guide plate. A reflective material is coated on the inner surface of the lamp housing to reflect light emitted from the fluorescent lamp to a side surface of the light guide plate 120, thereby improving light efficiency.

The guide panel 125 is coupled to the lower cover 140 to surround the light guide plate 120, an edge of the optical sheet 134, and the side surface of the lower cover 140.

The reflection plate 128 is disposed under the light guide plate 120. The reflection plate 128 reflects light emitted from the lower surface of the light guide plate 120 to improve light efficiency.

The middle frame 160 is disposed under the display module 100. The middle frame 160 may be a part of the outer case of the display device, and the display module 100 is coupled to the middle frame 160 such that the display module 100 and the outer case are assembled. That is, the middle frame 160 is a medium by which the display module 100 and other parts of the outer case are coupled to each other. In these figures, entire body of the outer case is not shown for simplicity. However, the middle frame 160 may be formed in a part of a single body of the outer case, such that the display module 100 may be directly coupled to other parts of the outer case through the middle frame 160.

When the middle frame 160 is integrally formed with the outer case as described above, the middle frame 160 shown in these figures represents a part of the outer case.

The middle frame 160 includes a bottom surface and a side surface extending from the bottom surface. When the middle frame 160 is coupled to the display module 100, the bottom surface of the middle frame 160 is disposed under the lower cover 140, and the side surface of the middle frame 160 extends outward of the side surface of the guide panel 125 to accommodate a portion of the display module 100 therein.

As shown in FIG. 2, the guide panel 125 includes an upper surface part 125a on which the liquid crystal panel 110 is placed to be supported, a side surface part 125b extending downward from the upper surface part 125a, and a first coupling part 125c provided at the side surface part 125b. In addition, the middle frame 160 includes a lower surface part 160a, a side surface part 160b extending upward towards the front of the display panel from the lower surface part 160a, and a second coupling part 160c provided at the side surface part 160b. In FIG. 2, the upper surface part 125a corresponds to a front of a display device, and the lower surface part 160a corresponds to a back of the display device. In this embodiment, the middle frame 160 covers a back of the display module opposite to the front of the display module. The side surface part 125b of the guide panel 125 corresponds to the side surface part 160b of the middle frame 160, and the display module 100 is coupled to the middle frame 160 as the first coupling part 125c of the guide panel 125 and the second coupling part 160c of the middle frame 160 are fastened to each other. The first coupling part 125c and the second coupling part 160c may have a hook structure in which they are latched to each other. It will be apparent that the first coupling part 125c and the second coupling part 160c are not limited to the hook structure and may have various structures. For example, the first coupling part 125c and the second coupling part 160c may have a mechanical coupling structure such as a screw and a bolt, by which the guide panel 125 and the middle frame 160 are mechanically coupled to each other, or may have an adhesive structure such as a double-sided tape or an adhesive.

In one or more embodiments, the coupling structure of the first coupling part 125c and the second coupling part 160c is disposed in a lower region of the liquid crystal panel 110, below the upper surface part 125a of the guide panel 125. On the upper surface part 125a, the liquid crystal panel 110 can be placed. In addition, the side surface part 160b of the middle frame 160 is also disposed under the upper surface part 125a of the guide panel 125.

Thus, when the guide panel 125 is coupled to the middle frame 160, all the parts of the middle frame 160 are disposed under the upper surface part 125a of the guide panel 125, so that any part of the middle frame 160 does not extend to an upper region of the upper surface part 125a. In addition, when the guide panel 125 is coupled to the middle frame 160, all the parts of the middle frame 160 do not extend to the outside of the upper surface part 125a of the guide panel 125. In other words, when the display module 100 is assembled in the display device, the front and side of the liquid crystal panel 110 may be exposed at a screen side (i.e., front) of the display device, and other parts of the display device do not cover the screen side of the display device. Accordingly, the front and side of the display module 100 are exposed at the front of the display device. The front of the display device may have a flat surface, so that it is possible to manufacture a borderless display device in which a screen is not covered by any frame of the display device.

In some embodiments, when the display module 100 is assembled in the display device, not only the upper and side surfaces of the liquid crystal panel 110 are exposed to the outside, but also a space between the liquid crystal panel 110 and the upper surface part 125a of the guide panel 125 may be exposed to the outside. Since the space between the liquid crystal panel 110 and the upper surface part 125a of the guide panel 125 is a space connected to the light guide plate 120, light output through the upper surface of the light guide plate 120 is output to the outside through the space between the liquid crystal panel 110 and the upper surface part 125a of the guide panel 125. If light is output to the space between the liquid crystal panel 110 and the upper surface part 125a of the guide panel 125 as described above, light may be leaked to the side of the display device. The leakage light may become noticeable in a dark environment.

In the present disclosure, the adhesive member 150 is provided on the upper surface part 125a of the guide panel 125 to allow the liquid crystal panel 110 to be fixed to the guide panel 125. The adhesive member 150 is formed in a quadrangular band having a predetermined width to allow the liquid crystal panel 110 to be attached to the upper surface part 125a of the guide panel 125. The adhesive member 150 may be configured as a double-sided tape or may be configured as a foam pad.

The adhesive member 150 allows the liquid crystal panel 110 to be attached to the guide panel 125 and blocks light leaking through a space between the liquid crystal panel 110 and the guide panel 125. To this end, the adhesive member 150 is configured as a black double-side tape or black foam pad, so that light leaking through the space between the liquid crystal panel 110 and the guide panel 125 can be prevented.

The adhesive member 150 simply allows the liquid crystal panel 110 to the guide panel 125, but blocks light leaking to the side of the display device. Therefore, the adhesive member 150 may be referred to as a light blocking member.

The adhesive member 150 may be configured to have a specific color to improve external appearance of the display device. In one example, the adhesive member 150 having a specific color other than a black color allows a portion of light corresponding to a specific wavelength to pass through, while preventing other portions of the light corresponding to other wavelengths to pass through. The portion of the light corresponding to the specific wavelength travels to the side of the display device through the space between the liquid crystal panel 110 and the guide panel 125.

In one or more embodiments, the leaked light has the same color of the adhesive member 150, and the specific color is displayed in a band shape along the side of the display device to indicate a boundary of the display. The adhesive member 150 may be implemented with various colors, and corresponding colors may be presented along the boundary of the display.

Meanwhile, the area of the space between the liquid crystal panel 110 and the guide panel 125 is smaller than the side of the display device. Hence, when a band of a specific color is displayed at the side of the display device by the adhesive member 150, the width of the band may be narrow.

By implementing the sealant that seals the first and second substrates of the liquid crystal panel 110 including a material through which light having a specific wavelength can be transmitted, a portion of light supplied to the liquid crystal panel 110 is leaked between the first and second substrates, so that a band of a desired color can be displayed along the boundary of the liquid crystal panel 110.

In this case, light leaking through the space between the liquid crystal panel 110 and the guide panel 125 and light leaking to the side of the liquid crystal panel 110 may be configured to have the same color or may be configured to have different colors. Thus, a specific color having a band shape may be displayed at two places of the side of the display device for indicating a boundary of the display.

As described above, in one or more embodiments, the liquid crystal panel 110 is exposed to a screen-side surface, and other parts of the display device, such as the middle frame, do not cover the screen-side surface of the display device, so that it is possible to manufacture a borderless display device without using any separate part such as a cover glass. As a result, since the expensive cover glass is not used, the manufacturing cost of the display device can be reduced, and an increase in weight of the display device can be prevented. Furthermore, since the liquid crystal panel is exposed to the front of the screen without being covered by a frame, a non-display region in which an image is not displayed at an edge of the screen can be minimized. Accordingly, the area of the display device can be decreased. In addition, a process of attaching a cover glass can be omitted, and a manufacturing process of the display device can be reduced. Therefore, the manufacturing efficiency of the display device can be improved.

Figure 3:
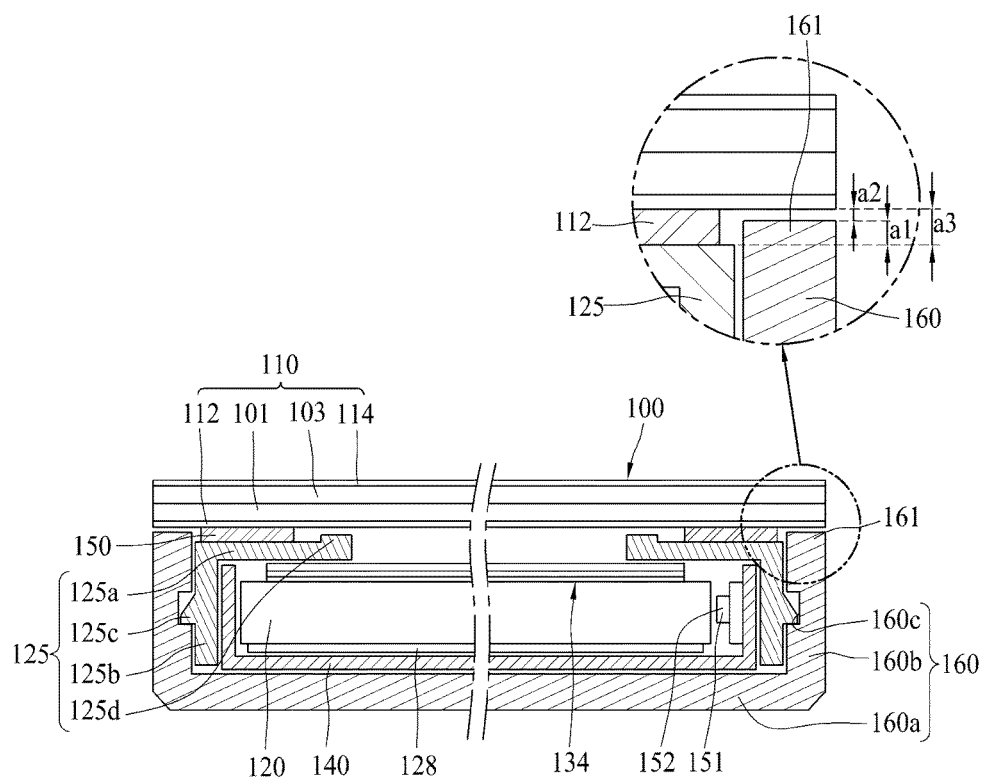
FIG. 3 is a sectional view illustrating another structure of the display device according to the first exemplary embodiment.

FIG. 3 is a sectional view illustrating another structure of the borderless display device according to the first exemplary embodiment. The structure of the display device is almost similar to that of the display device shown in FIG. 2. Therefore, descriptions of identical parts are omitted, and only different parts will be described.

As shown in FIG. 3, in the borderless display device having this structure, a light shielding part 161 is disposed on the upper surface of the side surface part 160*b* of the middle frame 160. The light shielding part 161 blocks light emitted from the display module 100 from being output to the outside. The reason why the light shielding part 161 is provided in the borderless display device of the present disclosure is as follows.

As mentioned in the description of FIG. 2, in the borderless display device of the present disclosure, since the middle frame 160 does not extend to an upper portion of the guide panel 125, there is no structure at the side of the liquid crystal panel 110 and the side of the space between the liquid crystal panel 110 and the guide panel 125. Hence, this region is exposed to the outside, and therefore, light output to the upper surface of the light guide plate 120 through the space between the liquid crystal panel 110 and the guide panel 125 is output to the outside. The adhesive member 150 that blocks light is disposed between the liquid crystal panel 110 and the guide panel 125, but it is difficult for the adhesive member 150 to completely block light. Hence, a portion of the light is leaked through the adhesive member 150.

In addition, as the adhesive member 150 is formed of a material through which light having a specific wavelength is partially transmitted, a boundary of the display can be indicated with light with a color corresponding to the specific wavelength.

In the borderless display device having this structure, as the light shielding part 161 is provided, light transmitted through the adhesive member 150 disposed between the liquid crystal panel 110 and the upper surface part 125*a* of the guide panel 125 is blocked, so that it is possible to prevent light from being leaked to the side of the display device. At this time, a height a1 of the light shielding part 161 is set to be smaller than a width a3 of the space between the liquid crystal panel 110 and the upper surface part 125*a* of the guide panel 125. Ideally, as the height a1 of the light shielding part 161 and the width a3 of the space between the liquid crystal panel 110 and the upper surface part 125*a* of the guide panel 125 are set to be equal to each other, light leaking through the space between the liquid crystal panel 110 and the guide panel 125 may be completely blocked. However, the height a1 of the light shielding part 161 is set to be smaller than the width a3 of the space between the liquid crystal panel 110 and the upper surface part 125*a* of the guide panel 125 to take into consideration of an assembly tolerance of the display device. Hence, a space having a set width a2 between the light shielding part 161 and the liquid crystal panel 110 may be formed.

The light shielding part 161 may be integrally formed with the side surface part 160*b* of the middle frame 160 to extend from the upper surface of the side surface part 160*b* of the middle frame 160. Alternatively, the light shielding part 161 may be provided separately from the middle frame 160 to be installed on the upper surface of the middle frame 160. In this figure, as the light shielding part 161 is formed to have the same area as the entire upper surface of the side surface part 160*b* of the middle frame 160, the light shielding part 161 is configured to extend from the side surface part 160*b* of the middle frame 160. However, as the light shielding part 161 is formed to have an area smaller than that of the side surface part 160*b* of the middle frame 160, the light shielding part 161 may be configured in a shape protruding from a partial region of the upper surface of the side surface part 160*b* of the middle frame 160.

In addition, as shown in FIG. 3, a protruding part 125*d* (also referred to as "a light shielding part 125*d*" herein) may be provided at an end portion of the upper surface part 125*a* of the guide panel 125. The protruding part 125*d* protrudes toward the liquid crystal panel 110 in a space between the optical sheet 134 and the liquid crystal panel 110 to prevent light from being leaked between the liquid crystal panel 110 and the guide panel 125.

As described above, in the present disclosure, the light shielding part 161 can block light from being leaked through the space between the liquid crystal panel 110 and the guide panel 125, and the leakage of light can also be prevented by the protruding part 125*d* disposed at the end portion of the side surface part 125*b* of the guide panel 125. In some embodiments, the light shielding part 161 is implemented and the protruding part 125*d* may be omitted.

Figure 4:
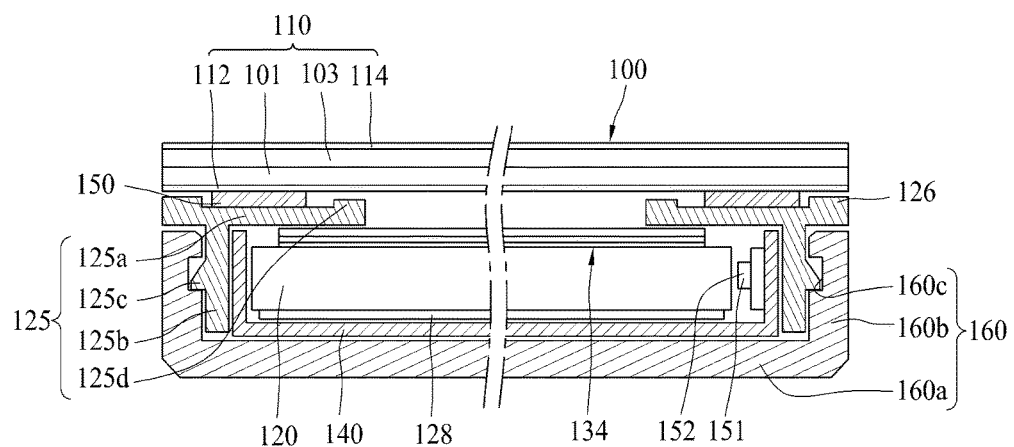
FIG. 4 is a sectional view illustrating another structure of the display device according to the first exemplary embodiment.

FIG. 4 is a sectional view illustrating still another structure of the borderless display device according to the first exemplary embodiment. The structure of the display device is similar to that of the display device shown in FIG. 2. Therefore, descriptions of identical parts are omitted, and only different parts will be described.

As shown in FIG. 4, in the borderless display device having this structure, a light shielding part 126 for blocking light leaking through the space between the liquid crystal panel 110 and the guide panel 125 is installed in a partial region of the upper surface part 125*a* of the guide panel 125. In this case, the light shielding part 126 may be integrally formed with the guide panel 125. Alternatively, the light shielding part 126 may be provided separately from the guide panel 125 to be installed at a portion of the upper surface part 125*a* of the guide panel 125.

In the borderless display device having this structure, a height of the light shielding part 126 is smaller than a distance between the liquid crystal panel 110 and the upper surface part 125a of the guide panel 125 in consideration of an assembly tolerance.

Also, in the borderless display device having this structure, the protruding part 125d disposed at the end portion of the upper surface part 125a of the guide panel 125 is also formed, so that light leaking through the space between the liquid crystal panel 110 and the guide panel 125 can be additionally blocked.

Figure 5:
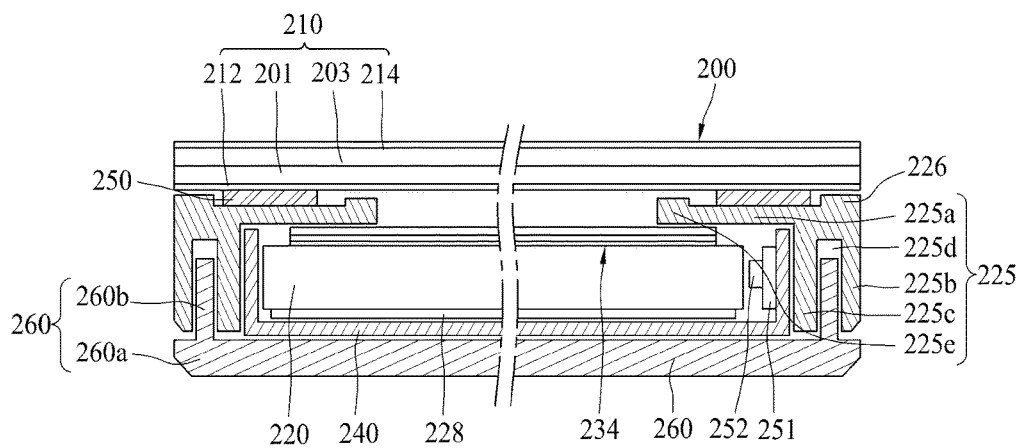
FIG. 5 is a sectional view of a display device according to a second exemplary embodiment.

FIG. 5 is a sectional view of a borderless display device according to a second exemplary embodiment. The structure of the display device of this exemplary embodiment is identical to that of the display device of the first exemplary embodiment except the middle frame, the guide panel, and a coupling structure thereof. Therefore, descriptions of identical parts are omitted, and only different parts will be described. Components 200, 201, 203, 210, 212, 214, 220, 228, 234, 240, 250, 251, 252 in FIG. 5 may correspond to components 100, 101, 103, 110, 112, 114, 120, 128, 134, 140, 150, 151, 152 in FIG. 2, respectively. Thus, the detailed description thereof is omitted herein.

As shown in FIG. 5, in the display device of this exemplary embodiment, a guide panel 225 includes an upper surface part 225a (also referred to as "a body portion 225a" herein) supporting a liquid crystal panel 210 and two side surface parts 225b and 225c (also referred to as "fastening portions 225b and 225c" respectfully herein) extending downward from the upper surface part 225a, and a middle frame 260 includes a lower surface part 260a and a side surface part 260b. The side surface parts 225b and 225c of the guide panel 225 are formed to be spaced apart from each other at a predetermined distance, and connected to the upper surface part 225a of the guide panel 225, so that a coupling space 225d is formed by the side surface parts 225b and 225c and the upper surface part 225a of the guide panel 225. The side surface part 260b of the middle frame 260 of an outer case of the display device is located in the coupling space 225d. A distance between the side surface parts 225b and 225c of the guide panel 225, i.e., a width of the coupling space 225d is almost similar to a width of the side surface part 260b of the middle frame 260. Thus, if the side surface part 260b of the middle frame 260 is inserted into the coupling space 225d of the guide panel 225, both surfaces of the side surface part 260b of the middle frame 260 can contact the side surface parts 225b and 225c of the guide panel 225, respectively, so that a display module 200 may be fixed to the display device.

In addition, when the side surface part 260b of the middle frame 260 is inserted into the coupling space 225d of the guide panel 225 as the side surface parts 225b and 225c of the guide panel 225 are configured in a plate shape having elasticity and the distance between the side surface parts 225b and 225c of the guide panel 225, i.e., the width of the coupling space 225d is formed smaller than the width of the side surface part 260b of the middle frame, the side surface parts 225b and 225c of the guide panel 225 are spread apart by the side surface part 260b of the middle frame 260, and press the side surface part 260b of the middle frame 260 by elasticity. Thus, the guide panel 225 and the middle frame 260 can be more firmly fixed to each other.

A light shielding part 226 may be disposed in a partial region of the upper surface part 225a of the guide panel 225. The light shielding part 226 blocks light leaking through a space between the liquid crystal panel 210 and the upper surface part 225a of the guide panel 225, so that it is possible to prevent light from being leaked to the side of the display device. The light shielding part 226 may be integrally formed with the guide panel 225. Alternatively, the light shielding part 226 may be formed separately from the guide panel 225 to be installed on the upper surface part 225a of the guide panel 225.

In addition, as shown in FIG. 5, a light shielding part 225e (also referred to as "a protruding part 225e" herein) may be provided at an end portion of the upper surface part 225a of the guide panel 225. The protruding part 225e protrudes toward the liquid crystal panel 110 in a space between the light guide plate 220 and the liquid crystal panel 210 to prevent light from being leaked between the liquid crystal panel 210 and the guide panel 125.

In one or more embodiments, the light shielding part 226 may be omitted, and an attaching member 250, e.g., having a black color may be formed to attach the liquid crystal panel 210 to the guide panel 225. Thus, light leaking through a space between the liquid crystal panel 210 and the upper surface part 225a of the guide panel 225 can be reduced. The light shielding part 226 may be additionally provided, so that light can be more efficiently blocked.

In some embodiments, the light shielding part 226 may be omitted, and the attaching member 250 is formed of a material of a specific color (i.e., through which light having a specific wavelength is transmitted), so that the light of the specific color may be leaked between the liquid crystal panel 210 and the upper surface part 225a of the guide panel 225. Hence, a boundary of the display can be indicated by the specific color.

As described above, in the display device of this exemplary embodiment, the side surface part 260b of the middle frame 260 is inserted and coupled into the coupling space 225d formed by the side surface parts 225b and 225c and the upper surface part 225a of the guide panel 225. Thus, the middle frame 260 and the guide panel 225 are coupled to each other without any separate coupling structure. As a result, the display device of this exemplary embodiment has a relatively simple structure compared to the display device of the first exemplary embodiment.

Also, in the structure of this exemplary embodiment, as the side surface part 260b of the middle frame 260 is disposed in the coupling space 225d disposed under the upper surface part 225a of the guide panel 225, all the parts of the middle frame 260 are disposed under the upper surface part 225a of the guide panel 225, and any structure does not extend to the outside of the guide panel 225. Thus, the front and side of the liquid crystal panel 210 are exposed to the front at a screen side of the assembled display device, and other parts of the display device including the middle frame 260 do not cover the front of the display device. Accordingly, the front of the display device can be entirely configured as a flat surface having the same level, so that it is possible to manufacture a borderless display device in which the front of the display is not covered by any frame of the display device.

Figure 6:
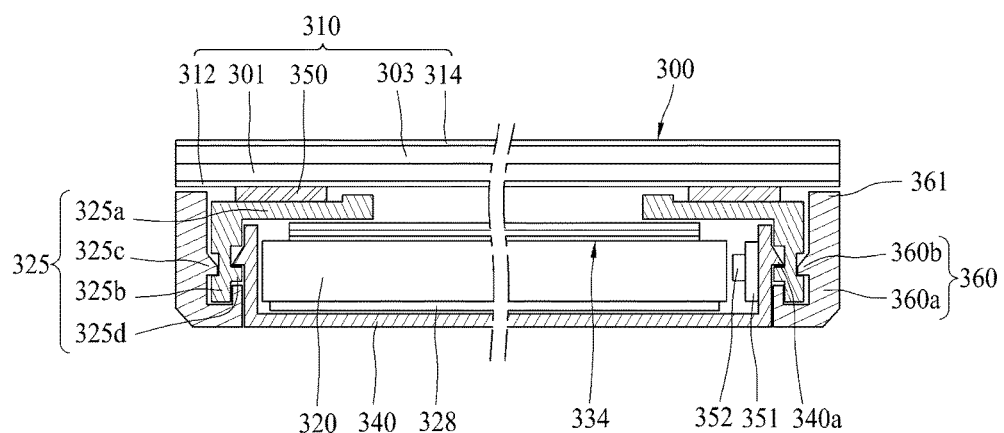
FIG. 6 is a sectional view of a display device according to a third exemplary embodiment.

FIG. 6 is a sectional view of a borderless display device according to a third exemplary embodiment. The structure of the display device of this exemplary embodiment is identical to that of the display device of the first exemplary embodiment except the middle frame, the guide panel, and a coupling structure thereof. Therefore, descriptions of identical parts are omitted, and only different parts will be described. In this figure, although identical parts in FIGS. 2 and 6 are designated by different reference numerals (e.g., 1XX in FIG. 2 and 3XX of FIG. 6), descriptions of the identical parts may be replaced with those of FIG. 2.

As shown in FIG. 6, in the display device having this structure, a side surface part 360a is provided in the middle frame 360 without a lower surface part of the middle frame. A first coupling part 360b is provided at the side surface part 360a. In addition, a guide panel 325 of a display module 300 includes an upper surface part 325a supporting a liquid crystal panel 310, a side surface part 325b extending downward from the upper surface part 325a, and a second coupling part 325c and a third coupling part 325d formed at the side surface part 325b. Also, a fourth coupling part 340a is provided in a lower cover 340.

At this time, as the second and third coupling parts 325c and 325d formed at the side surface part 325b of the guide panel 325 are respectively formed at both surfaces of the side surface part 325b, the second coupling part 325c is coupled to the first coupling part 360b of the side surface part 360a of the middle frame 360, and the third coupling part 325d is coupled to the fourth coupling part 340a of the lower cover 340, so that the display module 300 is coupled to the display device. That is, in this structure, the side surface part 325b of the guide panel 325 is coupled to the middle frame 360 and the lower cover 340, so that the display module 300 is coupled to the display device.

Also, in this structure, since all the parts of the middle frame 360 are disposed under the guide panel 325, the front and side of the liquid crystal panel 310 are exposed to the front at a screen side of the assembled display device, and other parts of the display device including the middle frame 360 do not cover the front of the display device. Accordingly, the front of the display device is entirely configured as a flat surface having the same level, so that it is possible to manufacture a borderless display device in which the front of the display device is not covered by any frame of the display device.

A light shielding part 361 is provided on the upper surface of the side surface part 360a of the middle frame 360. As the light shielding part 361 extends by a set distance from the upper surface of the side surface part 360a of the middle frame 360, light leaking through a space between the liquid crystal panel 310 and the upper surface part 325a of the guide panel 325 is blocked, so that it is possible to prevent light from being leaked to the side of the display device.

In some embodiments, any separate light shielding part may be omitted, and an attaching member 350, e.g., having a black color, may be formed to attach the liquid crystal panel 310 to the guide panel 325. Thus, light leaking through a space between the liquid crystal panel 310 and the upper surface part 325a of the guide panel 325 can be reduced. The light shielding part 361 may be additionally provided, so that light can be more efficiently blocked.

In some embodiments, the light shielding part 361 may be omitted, and the attaching member 350 is formed of a material of a specific color (i.e., through which light having a specific wavelength is transmitted), so that the light of the specific color is leaked between the liquid crystal panel 310 and the upper surface part 325a of the guide panel 325. Hence, a boundary of the display can be indicated by the specific color.

Figure 7:
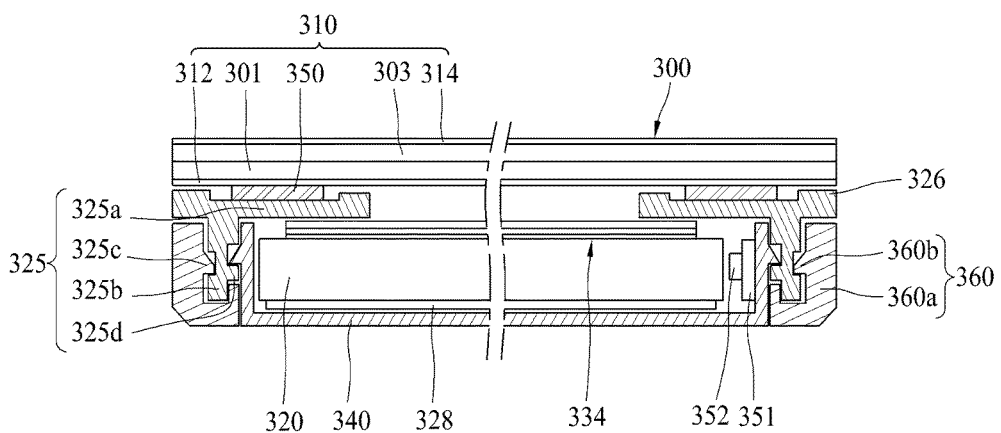
FIG. 7 is a sectional view illustrating another structure of the display device according to the third exemplary embodiment.

FIG. 7 is a sectional view illustrating another structure of the display device according to the third exemplary embodiment.

As shown in FIG. 7, in the display device having this structure, a light shielding part 326 is not formed in the middle frame 360 but provided at the upper surface part 325a of the guide panel 325, so that light leaking through a space between the liquid crystal panel 310 and the upper surface of the guide panel 325 can be blocked. In this case, the light shielding part 326 may be integrally formed with the upper surface part 325a of the guide panel 325. Alternatively, the light shielding part 326 may be formed separately from the upper surface part 325a of the guide panel 325 to be installed on the upper surface part 325a of the guide panel 325.

Figure 8A:
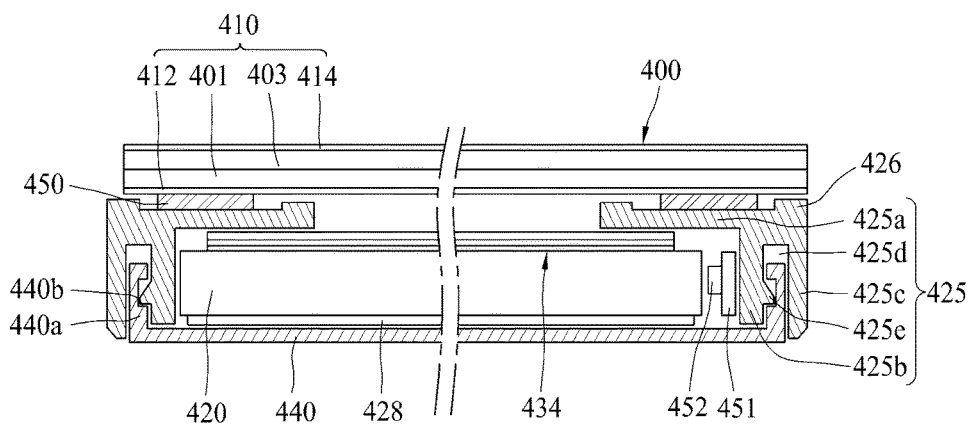
FIGS. 8A and 8B are sectional views of a display device according to a fourth exemplary embodiment.
Figure 8B:
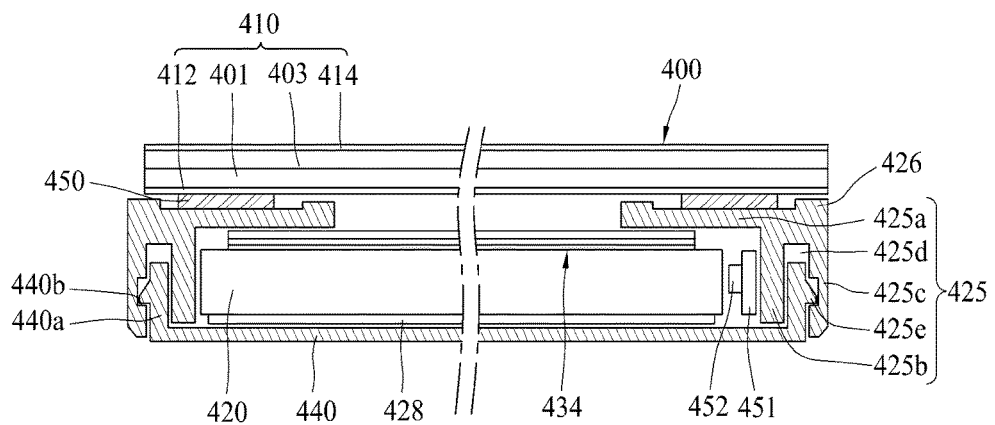

FIGS. 8A and 8B are sectional views of a borderless display device according to a fourth exemplary embodiment. The structure of the display device of this exemplary embodiment is identical to that of the display device of the first exemplary embodiment except the middle frame, the guide panel, and a coupling structure thereof. Therefore, descriptions of identical parts are omitted, and only different parts will be described. Components 400, 401, 403, 410, 412, 414, 420, 428, 434, 450 in FIGS. 8A and 8B may correspond to components 100, 101, 103, 110, 112, 114, 120, 128, 134, 150 in FIG. 2, respectively. Thus, the detailed description thereof is omitted herein.

As shown in FIG. 8A, in the display device having this structure, any separate coupling means does not exists, and a display module is directly coupled to the display device. That is, in the first to third exemplary embodiments, the middle frame is provided such that the display module is coupled to the middle frame. On the other hand, in this exemplary embodiment, the middle frame is omitted, and the display module is directly coupled to the display device.

A guide panel 425 includes an upper surface part 425a (also referred to as "a body portion 425a" herein) and two side surface parts 425b and 425c (also referred to as "fastening portions 425b and 425c" respectfully herein) extending downward from the upper surface part 425a. The side surface parts 425b and 425c are formed to be spaced apart from each other at a predetermined distance, and connected to the upper surface part 425a, so that a coupling space 425d is formed by the side surface parts 425b and 425c and the upper surface part 425a. A side surface part 440a of a lower cover 440 of the display device is located in the coupling space 425d.

A first coupling part 425e is provided at a first side surface part 425b (side surface part disposed adjacent to a light guide plate 420) of the guide panel 425, and a second coupling part 440b is provided at the side surface part 440a of the lower cover 440. As the first coupling part 425e and the second coupling part 440b are coupled to each other, the lower cover 440 is fixed to the guide panel 425. In this case, the first coupling part 425e may be protruded to have a convex shape, and the second coupling part 440b may be indented to have a concave shape, so that the lower cover 440 can be coupled to the guide panel 425 as the first coupling part 425e is inserted into the second coupling part 440b. Alternatively, the first coupling part 425e may be indented to have a concave shape, and the second coupling part 440b may be protruded to have a convex shape, so that the lower cover 440 can be coupled to the guide panel 425 as the second coupling part 440b is inserted into the first coupling part 425e.

As shown in FIG. 8B, the first coupling part 425e may be formed at a second side surface part 425c, so that the lower cover 440 can be coupled to the guide panel 425 as the first coupling part 425e is coupled to the second coupling part 440b formed at the side surface part 440a of the lower cover 440.

A light shielding part 426 is provided at the upper surface part 425a of the guide panel 425. As the light shielding part 426 protrudes by a set distance from the upper surface of the side surface part 425a of the guide panel 425, light leaking through a space between a liquid crystal panel 410 and the upper surface part 425a of the guide panel 425 can be reduced.

In the display device of this exemplary embodiment, any separate light shielding part may be omitted, and an attaching member 450 having a black color may be formed, so that light through a space between the liquid crystal panel 410 and the upper surface part 425*a* of the guide panel 425 can be reduced. The light shielding part 426 may be additionally provided, so that light can be more efficiently blocked.

In some embodiments, the light shielding part 462 may be omitted, and the attaching member 450 is formed of a material of a specific color (i.e., through which light having a specific wavelength is transmitted), so that the light of the specific color is leaked between the liquid crystal panel 410 and the upper surface part 425*a* of the guide panel 425. Hence, a boundary of the display can be indicated by the specific color.

Also, in this structure, since any coupling configuration, such as a middle frame, for coupling the display module to the display device is not provided, the front and side of the liquid crystal panel 410 are exposed to the front at a screen side of the assembled display device. Accordingly, the front of the display device is entirely configured as a flat surface having the same level, so that it is possible to manufacture a borderless display device in which the screen of the display device is not covered by any frame of the display device.

In the embodiments shown in FIGS. 8A and 8B, a side of the light shielding portion 426, a side of the body portion 425*a*, and a side of the fastening portion 425*b* facing away from a center of the display device are integral to form a smooth surface. Moreover, the second light shielding portion, the side of the body portion, and the second fastening portion may be externally exposed, and not covered by any portion of the display device itself.

In the embodiments shown in FIGS. 8A and 8B, the middle frame is omitted, and the lower cover 440, to which the light guide plate 420 is coupled, covers the rear side of the display module. Moreover, a light source (e.g., LED substrate 451 and LEDs 452) for projecting light to the light guide plate 420 may be directly coupled to a side of the fastening portion 425*b* facing the light guide plate 420.

As described above, in the present disclosure, when the display module is assembled with the display device, the middle frame of the outer case of the display device is coupled to the display module. At this time, since the middle frame is disposed under the display panel, particularly, under the guide panel that is disposed under the display panel and supports the guide supporting, any parts of the display device including the middle frame do not protrude upward from the display panel. Thus, a glass substrate of the display panel is exposed to the outside of the front of the display device without being covered by a frame.

As a result, since the glass substrate is exposed without being covered by a frame, the surface of the display device in which a screen is displayed is entirely formed as a smooth plane having the same level. Accordingly, it is possible to manufacture a display device having a borderless screen.

Also, in the present disclosure, a region surrounding a display region in which an actual image is implemented is limited to the peripheral region of the display panel, and thus the area of a bezel of the display device can be minimized. Thus, the size of the display device can be decreased, and an image can be implemented through the entire region at the front of the display device.

Further, in the present disclosure, the borderless display device can be implemented without any separate part such as a cover glass, so that the manufacturing cost of the display device can be reduced. In addition, it is possible to prevent the weight of the display device from being increased by obviating the cover glass, and a manufacturing process of the display device can be simplified.

Furthermore, in the present disclosure, light leaking to the side of the display device can be reduced, so that it is possible to prevent light from being leaked to the side of the display device. In some embodiments, light of a specific color is leaked to the side of the display device, to indicate a boundary of the display.

In the above detailed description, the structure of the present disclosure is described as a specific structure, but the present disclosure is not limited to the specific structure. The essential point of the present disclosure is that, when the display device is manufactured, the liquid crystal panel may be exposed to the screen side of the display device, and other parts of the display device may not cover the screen side of the display device, so that the screen-side surface is formed in a borderless structure. Therefore, any structure may be applied to the present disclosure as long as it is implemented as the borderless structure.

That is, in the present disclosure, the coupling structure of the middle frame and the guide panel, in which the display module is coupled to the display device, is located under the display panel, and the uppermost portion of the middle frame is located under the display panel, so that the front of the display may not be covered by any parts of the display device.

Although the liquid crystal display module is described as an example in the above description, the present disclosure is not limited to the liquid crystal display module, and may be applied to flat panel display modules having various structures, such as an organic light emitting display module and an electrophoretic display module. Therefore, when another flat panel display module is applied, the liquid crystal panel coupled to the display device may include the organic light emitting display module and the electrophoretic display module.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A display device comprising:
a display panel;
a guide panel coupled to a surface of the display panel through an attaching member, the guide panel including:
a body portion facing the surface of the display panel in a first direction,
a first light shielding portion protruding from the body portion in the first direction towards the surface of the display panel, the first light shielding portion closer to a center of the display panel than the attaching member,
a second light shielding portion protruding from the body portion in the first direction towards the surface of the display panel, the second light shielding portion farther away from the center of the display panel than the attaching member, wherein an upper surface of the second light shielding portion is placed below the surface of the display panel,
a first fastening portion protruding from the body portion in a second direction away from the first direction, and
a second fastening portion protruding from the body portion in the second direction, the second fastening portion disposed farther away from the center of the display panel than the first fastening portion is disposed from the center of the display panel, and at least a part of the second fastening portion covered by the display panel in the first direction,
wherein the body portion, the first light shielding portion, the second light shielding portion, the first fastening portion, and the second fastening portion are integrally formed to form the guide panel;
a light guide placed below the display panel, wherein an upper surface of the light guide faces the display panel in the first direction, and a bottom surface of the light guide faces the second direction; and
a cover including:
a planar surface facing the display panel and the bottom surface of the light guide in the first direction, and
a side surface protruding from the planar surface towards the first direction, the side surface inserted between the first fastening portion and the second fastening portion,
wherein the planar surface and the side surface are integrally formed to form the cover, and wherein the planar surface is not covered by any portion of the display device in the second direction,
wherein the attaching member attaches the body portion of the guide panel to the surface of the display panel, and wherein at least a part of a side of the second fastening portion overlapping with the light guide in a third direction different from the first direction and the second direction is not covered by any portion of the display device in the third direction, the third direction being along the light guide, wherein the first fastening portion and the second fastening portion face each other, and a first fastening surface of the first fastening portion and a second fastening surface of the second fastening portion press the side surface of the cover therebetween such that the first fastening surface contacts the side surface.

2. The display device of claim 1, wherein another surface of the display panel facing in the first direction is not covered by any portion of the display device itself.

3. The display device of claim 1, wherein the second light shielding portion is exposed in the third direction different from the first direction and the second direction.

4. The display device of claim 3, wherein a side of the second light shielding portion, a side of the body portion, and the side of the second fastening portion are integral to form a flushed surface, the side of the second light shielding portion, the side of the body portion, and the side of the second fastening portion being exposed in the third direction.

5. The display device of claim 4, wherein the side of the second light shielding portion, the side of the body portion, and the side of the second fastening portion are not covered by any portion of the display device in the third direction.

6. The display device of claim 3,
wherein the light guide is directly coupled to an additional cover, the additional cover between the light guide and the cover, the light guide to project light towards the surface of the display panel,
wherein the second light shielding portion prevents the light from leaking in the third direction.

7. The display device of claim 6, further comprising a light source coupled to the additional cover, the light source to project the light into the light guide.

8. The display device of claim 3,
wherein the light guide is directly coupled to the planar surface of the cover, the light guide to project light towards the surface of the display panel,
wherein the second light shielding portion prevents the light from leaking in the third direction.

9. The display device of claim 8, further comprising a light source directly coupled to a surface of the first fastening portion facing away from the second fastening portion, the light source to project the light into the light guide.

10. The display device of claim 1, wherein the attaching member is configured to pass through a portion of light corresponding to a predetermined wavelength, and to filter another portion of the light corresponding to another wavelength.

11. The display device of claim 1, wherein the first fastening portion includes a coupling portion protruding towards the second fastening portion, and wherein the side surface includes an indented portion corresponding to the coupling portion, the coupling portion inserted into the indented portion to couple the cover to the guide panel.

12. The display device of claim 1, wherein the side surface includes a coupling portion protruding towards the first fastening portion, and wherein the first fastening portion includes an indented portion corresponding to the coupling portion, the coupling portion inserted into the indented portion to couple the cover to the guide panel.

13. The display device of claim 1, wherein the first fastening portion includes a coupling portion protruding towards the second fastening portion, and wherein the side surface includes an indented portion corresponding to the coupling portion, the coupling portion inserted into the indented portion to couple the cover to the guide panel.

14. The display device of claim 1, wherein the side surface includes a coupling portion protruding towards the first fastening portion, and wherein the first fastening portion includes an indented portion corresponding to the coupling portion, the coupling portion inserted into the indented portion to couple the cover to the guide panel.

15. A display device comprising:
a display panel;
a guide panel coupled to a surface of the display panel through an attaching member, the guide panel including:
a body portion facing the surface of the display panel in a first direction,
a light shielding portion protruding from the body portion in the first direction towards the surface of the display panel, the light shielding portion farther away from a center of the display panel than the attaching member, wherein an upper surface of the light shielding portion is placed below the surface of the display panel, a first fastening portion protruding from the body portion in a second direction away from the first direction, and a second fastening portion protruding from the body portion in the second direction, at least a part of the second fastening portion covered by the display panel in the first direction, a side of the light shielding portion, a side of the body portion, and a side of the second fastening portion being integral to form a surface, and wherein the side of the light shielding portion, the side of the body portion, and the side of the second fastening portion are not covered by any portion of the display device itself in a third direction, wherein the body portion, the light shielding portion, the first fastening portion, and the second fastening portion are integrally formed to form the guide panel;

a light guide placed below the display panel, wherein an upper surface of the light guide faces the display panel in the first direction, and a bottom surface of the light guide faces the second direction; and a cover coupled to the guide panel through the first fastening portion and the second fastening portion, the cover including:

a planar surface facing the display panel and the bottom surface of the light guide in the first direction, and a side surface protruding from the planar surface towards the first direction, the side surface inserted between the first fastening portion and the second fastening portion, wherein the planar surface and the side surface are integrally formed to form the cover, and wherein the planar surface is not covered by any portion of the display device in the second direction, wherein the attaching member attaches the body portion of the guide panel to the surface of the display panel, and wherein at least a part of the side of the second fastening portion overlapping with the light guide in the third direction is not covered by any portion of the display device in the third direction, the third direction being along the light guide wherein the first fastening portion and the second fastening portion face each other, and a first fastening surface of the first fastening portion and a second fastening surface of the second fastening portion press the side surface of the cover therebetween such that the first fastening surface contacts the side surface.

16. The display device of claim 15, wherein another surface of the display panel facing in the first direction is not covered by said any portion of the display device itself.

17. The display device of claim 15,
wherein the light guide is directly coupled to an additional cover, the additional cover between the light guide and the cover, the light guide to project light towards the surface of the display panel,
wherein the light shielding portion prevents the light from leaking in the third direction.

18. The display device of claim 17, further comprising a light source coupled to the additional cover, the light source to project the light into the light guide.

19. The display device of claim 15, wherein the light guide is directly coupled to the planar surface of the cover, the light guide to project light towards the surface of the display panel,
wherein the light shielding portion prevents the light from leaking in the third direction.

20. The display device of claim 19, further comprising a light source directly coupled to the guide panel, the light source to project the light into the light guide.

21. The display device of claim 15,
wherein one of the first fastening portion and the second fastening portion includes a coupling portion protruding towards the other one of the first fastening portion and the second fastening portion, and
wherein the side surface includes an indented portion corresponding to the coupling portion, the coupling portion inserted into the indented portion to couple the cover to the guide panel.

22. The display device of claim 15,
wherein the side surface includes a coupling portion protruding towards one of the first fastening portion and the second fastening portion, and
wherein the one of the first fastening portion and the second fastening portion includes an indented portion corresponding to the coupling portion, the coupling portion inserted into the indented portion to couple the cover to the guide panel.

23. A display device comprising:
a display panel;
a guide panel coupled to a surface of the display panel through an attaching member, the guide panel including:
a body portion facing the surface of the display panel in a first direction,
a first light shielding portion protruding from the body portion in the first direction towards the surface of the display panel, the first light shielding portion closer to a center of the display panel than the attaching member,
a second light shielding portion protruding from the body portion in the first direction towards the surface of the display panel, the second light shielding portion farther away from the center of the display panel than the attaching member and the first light shielding portion, and at least a part of the second light shielding portion covered by the display panel in the first direction,
a first fastening portion protruding from the body portion in a second direction away from the first direction, and
a second fastening portion protruding from the body portion in the second direction, the second fastening portion disposed farther away from the center of the display panel than the first fastening portion,
wherein the body portion, the first light shielding portion, the second light shielding portion, the first fastening portion, and the second fastening portion are integrally formed to form the guide panel;
a light guide placed below the display panel, wherein an upper surface of the light guide faces the display panel in the first direction, and wherein a bottom surface of the light guide faces the second direction; and
a cover including:
a planar surface facing the display panel and the bottom surface of the light guide in the first direction, and
a side surface protruding from the planar surface towards the first direction, the side surface inserted between the first fastening portion and the second fastening portion,
wherein the planar surface and the side surface are integrally formed to form the cover, and wherein the planar surface is not covered by any portion of the display device in the second direction, wherein the attaching member attaches the body portion of the guide panel to the surface of the display panel, and wherein at least a part of a side of the second fastening portion overlapping with the light guide in a third direction different from the first direction and the second direction is not covered by any portion of the display device in the third direction, the third direction being along the light guide, wherein the first fastening portion and the second fastening portion face each other, and a first fastening surface of the first fastening portion and a second fastening surface of the second fastening portion press the side surface of the cover therebetween such that the first fastening surface contacts the side surface.

24. The display device of claim 23, wherein another surface of the display panel facing in the first direction is not covered by any portion of the display device itself.

25. The display device of claim 23, wherein the second light shielding portion is exposed in the third direction different from the first direction and the second direction.

26. The display device of claim 23, wherein a side of the second light shielding portion, a side of the body portion, and the side of the second fastening portion are integral to form a flushed surface, the side of the second light shielding portion, the side of the body portion, and the side of the second fastening portion being exposed in the third direction different from the first direction and the second direction.

27. The display device of claim 23, wherein the first fastening portion includes a coupling portion protruding towards the second fastening portion, and wherein the side surface includes an indented portion corresponding to the coupling portion, the coupling portion inserted into the indented portion to couple the cover to the guide panel.

28. The display device of claim 23, wherein the side surface includes a coupling portion protruding towards the first fastening portion, and wherein the first fastening portion includes an indented portion corresponding to the coupling portion, the coupling portion inserted into the indented portion to couple the cover to the guide panel.

29. The display device of claim 23, further comprising a light source directly coupled to a surface of the first fastening portion facing away from the second fastening portion.

* * * * *